March 30, 1965 P. J. MARAS 3,175,264
SLIDING LOGGING HOOK
Filed April 11, 1963
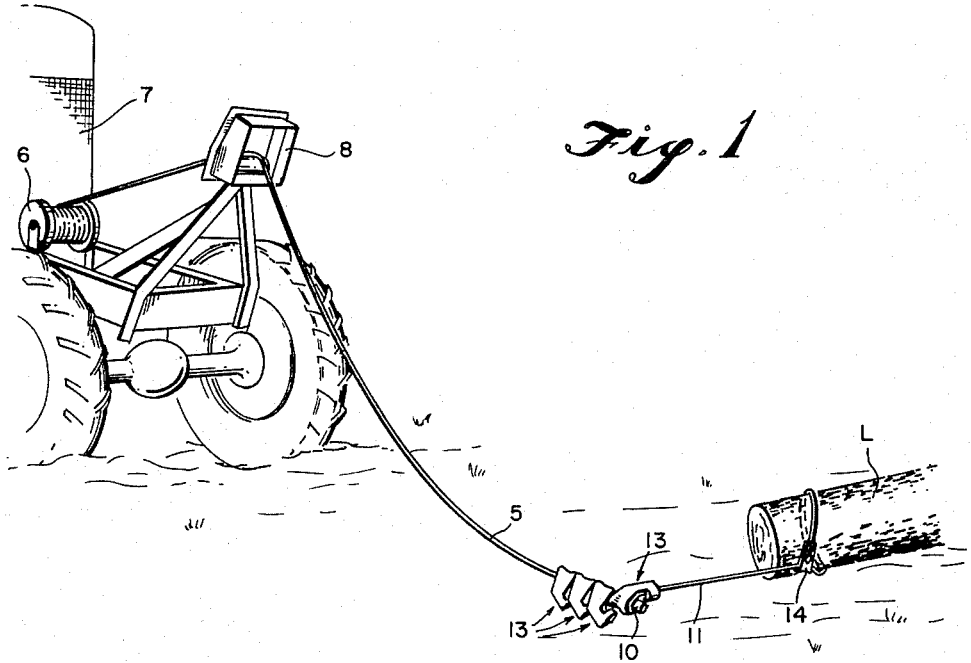
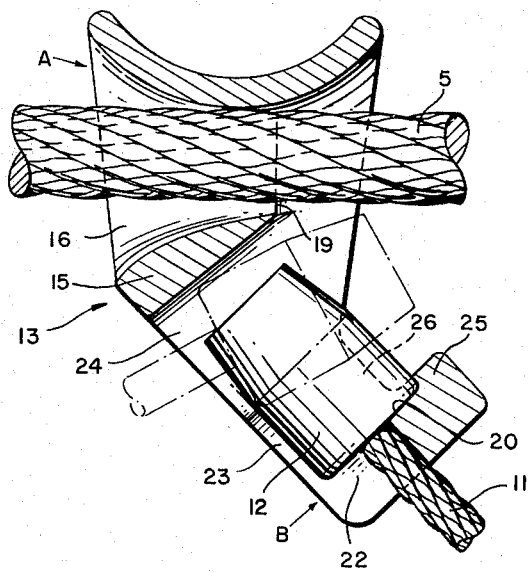
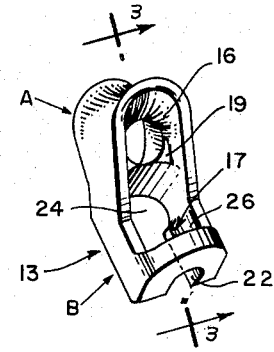
PERCY J. MARAS
INVENTOR.
BY *Seed & Berry*
ATTORNEYS

United States Patent Office 3,175,264
Patented Mar. 30, 1965

3,175,264
SLIDING LOGGING HOOK
Percy J. Maras, Buckley, Wash., assignor to Garrett
Enumclaw Co., Enumclaw, Wash.
Filed Apr. 11, 1963, Ser. No. 272,480
1 Claim. (Cl. 24—123)

This invention relates to a sliding hook of the type used in a logging operation, particularly in tractor-logging where a plurality of such hooks are reeved upon a winch line, being each adapted to have the inner end of a respective choker line attached thereto. As heretofore known, hooks for this purpose have comprised either a simple ring, a sleeve with an open hook, or what is commonly known as a Bardon hook. Rings have a severe cutting and kinking action on the winch line, and burn both the line and the ring. As regards sliding sleeves, the open hook is designed to accommodate an eye which is provided on the inner end of the choker line, and it is difficult to keep this eye on the hook when the winch line is in a slacked condition. Moreover, the eye itself is objectionable from the fact that it is time-consuming to form the eye on the line and an eye is not as long-lived as a ferrule. A regular Bardon choker hook has its hooking shank disposed perpendicular to the reeve-way and when applied to a winch line to perform the function of a sliding hook, is perforce cocked when subjected to the drag pull of a log and this kinks and burns the winch line.

The present invention aims to provide a sliding hook of strong and durable construction which overcomes the disadvantages of previously existing sliding hooks, and otherwise performs its intended function in an unusually efficient manner.

These and other more particular objects and advantages in view will appear and be understood in the course of the following description and claim, the invention consisting in the novel construction and in the adaptation and combination of parts hereinafter described and claimed.

In the accompanying drawing:

FIGURE 1 is a fragmentary perspective view illustrating a logging tractor and winch line, with several sliding hooks embodying teachings of the present invention reeved on said winch line, and showing a choker line as having been attached to one of said sliding hooks. While for simplicity in illustration only a single said choker line is shown, the sliding hooks are adapted to each accommodate a respective said choker line, an operator preliminary to a drag operation making up a turn of many logs which may be scattered over a radius of, say, 50′ or more.

FIG. 2 is a longitudinal vertical sectional view of one of said sliding hooks, with an associated winch line and choker line shown fragmentarily; and FIG. 3 is a reduced-scale perspective view of the sliding hook.

Referring to said drawing, and first describing the environment in which the sliding hook of the present invention is particularly designed to operate, the numeral 5 designates a winch line which runs from the winch 6 of a logging tractor 7, passing over a logging arch 8. The winch line has a plurality of the sliding hooks reeved thereon, and as a stop for these hooks has a ferrule 10 fixed to its free end. A respective choker line 11, having a diameter smaller than that of the winch line, is adapted to be removably attached to each of said sliding hooks, these choker lines being characterized in that a ferrule 12 is fixed to the end thereof which connects with the sliding hook. The manner in which the hooking attachment is made will be hereinafter described. Like the sliding hook, which is denoted generally by 13, the choker hook 14 provides a reeve-way through which the choker line is threaded.

Encircling a log L in the performance of its choking function, the choker line is set by hooking the choker hook with the end of the line opposite that which is to be connected with the sliding hook. In the arrangement which I prefer to employ, such end of the choker line has a ferrule fixed thereto and the manner in which this ferrule connects with hook 14 is or may be much the same as the connection between ferrule 12 and the sliding hook 13. The two hooks 13 and 14 each have their reeve-way located at one end and a socket, or stall as it will be hereinafter termed, for the concerned ferrule at the other end, the axes of the two being perpendicular in the instance of the choker hook and oblique in the instance of the sliding hook. It is the particular structural form of the sliding hook, including this obliquity, to which the present invention is directed.

Cast as a unitary elbowed body to provide two branches A and B and with said two branches angled at 45° to one another, the axis of the reeve-way 16 of the sliding hook extends substantially normal to the axial line of the branch A, while the stall 17 has its axis paralleling the axial line of the other branch. The term "axial line" as here used has reference to the two lines of the elbow figure, each centered in relation to a respective one of said two branches A and B, which lie in said 45° angular relation.

Considering that end of the reeve-way which lies at the crotch side of the angular body as the rear mouth and the other end as the front mouth, the reeve-way flares in both directions from center outwardly toward each of said mouths but whereas the front portion of the reeve-way is circumscribed by a wall so as to be separated from the stall 17, such separating portion 15 of the wall terminates at a point approximately central to the length of the reeve-way and thus exposes the stall to a rear portion of the reeve-way. The underside of such wall portion 15, and namely the surface thereof which lies in facing relation to the stall, has a vaulted configuration with its arch developed about an axis which is angled approximately 45° from the axial line of the reeve-way so as to place the ceiling of such vault normal, or approximately normal, to the axial line of the stall. Within the reeve-way and occupying a plane normal thereto at the forward extreme of the opening which lies between the stall and the reeve-way, there is provided a rearwardly facing shoulder 19. The function of this shoulder is to produce a seat against which the stop ferrule 10 can bear.

The stall is formed to a generally cylindrical shape, moderately larger in diameter than the diameter of the ferrule 12, and at the bottom has a ledge 20 of U-shape to take the thrust of the socketed ferrule. Defining this ledge is a radial slot 22 prolonged inwardly from the shank section 23 of a key-hole aperture provided in the front wall of the stall. The width of this shank section and its prolongation 22, and the diameter of the circular opening 24 of the key-hole aperture, are slightly larger than the diameters of the line 11 and the ferrule 12, respectively. Said vaulted underside of the wall 15 perforce defines the ceiling wall for said circular part 24 of the key-hole opening. In a manner which will be clearly apparent, insertion of the ferrule to and removal of the same from the stall is performed by tipping the ferrule into the position shown by broken lines in FIG. 3, and to accommodate such tipping the back wall of the stall presents a rearwardly facing throat which is completely open other than for a nosing lip 25 which rises in a moderate degree above the ledge. The cheek walls 26 are tangent to the circular opening 24 and lie parallel to one another and tangent to the side walls of the stall, thus allowing the ferrule, by said tipping of the same, to be manipulated between the full and broken-line positions of FIG. 2.

It will be seen from the foregoing that when the tractor is pulling a log which is laying under or close to the winch line the biased branch B of the sliding hook is enabled to point toward the log while the reeve-way remains fair on the winch line, thus obviating any kinking of the winch line and precluding any burning action even though the winch line is rendering through the reeve-way. A further advantage is that the wall 15 at the front, and the winch line 5 at the rear, effectively cover the socketed ferrule to guard against accidental dislodgment and require, for removal of the choker line, that the point of the ferrule be tipped into the broken-line position of FIG. 2 before the ferrule can be backed out of the stall. The presence of the winch line, while deterring dislodgment of the choker line's ferrule from the stall of the sliding hook, does not hinder removal by hand. It only deters accidental disengagement. The stop ferrule 10, when occupying the functioning position in which it is shown in FIG. 1, locks the ferrule of the endmost choker line against removal from its socket. The endmost sliding hook, and each sliding hook in turn, when its choker line is taut as a consequence of dragging logs, also locks the ferrule of a preceding sliding hook against removal from its socket. Removal of the endmost ferrule requires that the stop ferrule 10 be spaced to the rear thereof so as to lie in an out-of-the-way position. Similarly, removal of the other ferrules requires that the next following sliding hook 13 be spaced to the rear thereof so as to be in an out-of-the-way position.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

In combination with a winch line having at its outer end a ferrule which is adapted to serve a stop function, and choker line having a ferrule at its inner end, a sliding hook for attaching said choker line to the winch line, said sliding hook having an elbowed configuration providing two integral branches lying at an approximate 45° angle to one another, one of said branches having a through-opening extending front to rear thereof with its axis located normal to the axial line of the branch to form a reeve-way for the winch line, the other of said branches providing a cylindrical stall the axis of which coincides with the axial line of such other branch and presenting as an end wall for said stall a U-shaped ledge upon which the ferrule of the choker line seats for socketing such ferrule in the stall, said last-named branch pointing diagonally in a rearward direction when the hook is reeved upon the winch line, said last-named branch, in the wall thereof which faces forwardly when the hook is reeved upon the winch line, being provided with a key-hole aperture the circular opening of which accommodates the choker ferrule and whose shank opening accommodates the choker line and extends outwardly from such circular opening and thence radially inwardly into said end wall to give said ledge its U-shape, the rearwardly facing wall presenting a nosing lip rising only to a moderate height above the ledge and being otherwise open throughout the full width and height of the stall to produce a rearwardly facing throat into which a ferrule which occupies the stall, and which it is desired to disengage from the sliding hook, can be tilted to a position where its axis approximately coincides with that of the circular opening of the key-hole aperture preparatory to drawing the ferrule through said circular opening, the reeve-way presenting a rearwardly facing shoulder spaced inwardly from the rear end of the reeve-way and against which the stop ferrule seats when it is brought to bear against the sliding hook in a log-dragging operation, the sliding hook, from said shoulder rearwardly, having the side walls of the reeve-way and the side walls of the stall merging so that the rear end of the reeve-way is open to the stall and causes the lower portion of the seated stop ferrule to protrude into a port of said throat through which a ferrule which is socketed in the stall must be swung when said ferrule-disengaging operation is performed, the seated stop ferrule thus barring accidental disengagement of the socketed ferrule from the sliding hook.

References Cited by the Examiner
UNITED STATES PATENTS

| | | | |
|---|---|---|---|
| 2,251,319 | 8/41 | Brewer | 24—123.1 |
| 2,518,276 | 8/50 | Brawand | 24—123.1 |
| 2,637,591 | 5/53 | Maxfield et al. | 24—123.1 |
| 2,905,993 | 9/59 | Wernsing et al. | 24—123.1 |

FOREIGN PATENTS

| | | |
|---|---|---|
| 468,303 | 9/50 | Canada. |
| 644,443 | 7/62 | Canada. |

DONLEY J. STOCKING, *Primary Examiner.*